United States Patent
Bathelt et al.

(10) Patent No.: US 12,172,173 B2
(45) Date of Patent: Dec. 24, 2024

(54) METHOD BY WHICH A LUBRICANT FLOW RATE AT A CENTRIFUGE IS MONITORED

(71) Applicant: GEA MECHANICAL EQUIPMENT GMBH, Oelde (DE)

(72) Inventors: Thomas Bathelt, Oelde (DE); Wilfried Mackel, Lippetal-Herzfeld (DE)

(73) Assignee: GEA Mechanical Equipment GmbH, Oelde (DE)

( * ) Notice: Subject to any disclaimer, the term of this patent is extended or adjusted under 35 U.S.C. 154(b) by 1108 days.

(21) Appl. No.: 17/046,440

(22) PCT Filed: Apr. 4, 2019

(86) PCT No.: PCT/EP2019/058533
§ 371 (c)(1),
(2) Date: Oct. 9, 2020

(87) PCT Pub. No.: WO2019/197272
PCT Pub. Date: Oct. 17, 2019

(65) Prior Publication Data
US 2021/0170425 A1    Jun. 10, 2021

(30) Foreign Application Priority Data

Apr. 10, 2018   (DE) .................... 10 2018 108 471.4

(51) Int. Cl.
*B04B 9/12*      (2006.01)
*F16N 29/04*     (2006.01)

(52) U.S. Cl.
CPC ................ *B04B 9/12* (2013.01); *F16N 29/04* (2013.01)

(58) Field of Classification Search
CPC .................................. B04B 9/12; F16N 29/04
See application file for complete search history.

(56) References Cited

U.S. PATENT DOCUMENTS

| | | | |
|---|---|---|---|
| 4,497,200 A * | 2/1985 | Tournier | F02B 77/083 73/61.76 |
| 4,514,123 A | 4/1985 | Johnstone et al. | |

(Continued)

FOREIGN PATENT DOCUMENTS

| | | | |
|---|---|---|---|
| CN | 101327469 A | * | 12/2008 |
| CN | 201423315 Y | * | 3/2010 |

(Continued)

OTHER PUBLICATIONS

International Search Report mailed on Jul. 4, 2019 in related/corresponding International Application No. PCT/EP2019/058533.

(Continued)

*Primary Examiner* — Walter D. Griffin
*Assistant Examiner* — Shuyi S. Liu
(74) *Attorney, Agent, or Firm* — PATENT PORTFOLIO BUILDERS PLLC

(57) ABSTRACT

A method for monitoring a lubricant throughflow of a centrifuge is monitored involves rotating the drive shaft with the motor and simultaneously operating the lubricant supply to generate a lubricant throughflow through the bearing arrangement and monitoring a temperature of the lubricant throughflow through the bearing arrangement at at least one measurement point at or in the device for supplying lubricant.

20 Claims, 2 Drawing Sheets

(56) References Cited

U.S. PATENT DOCUMENTS

Figure 1:
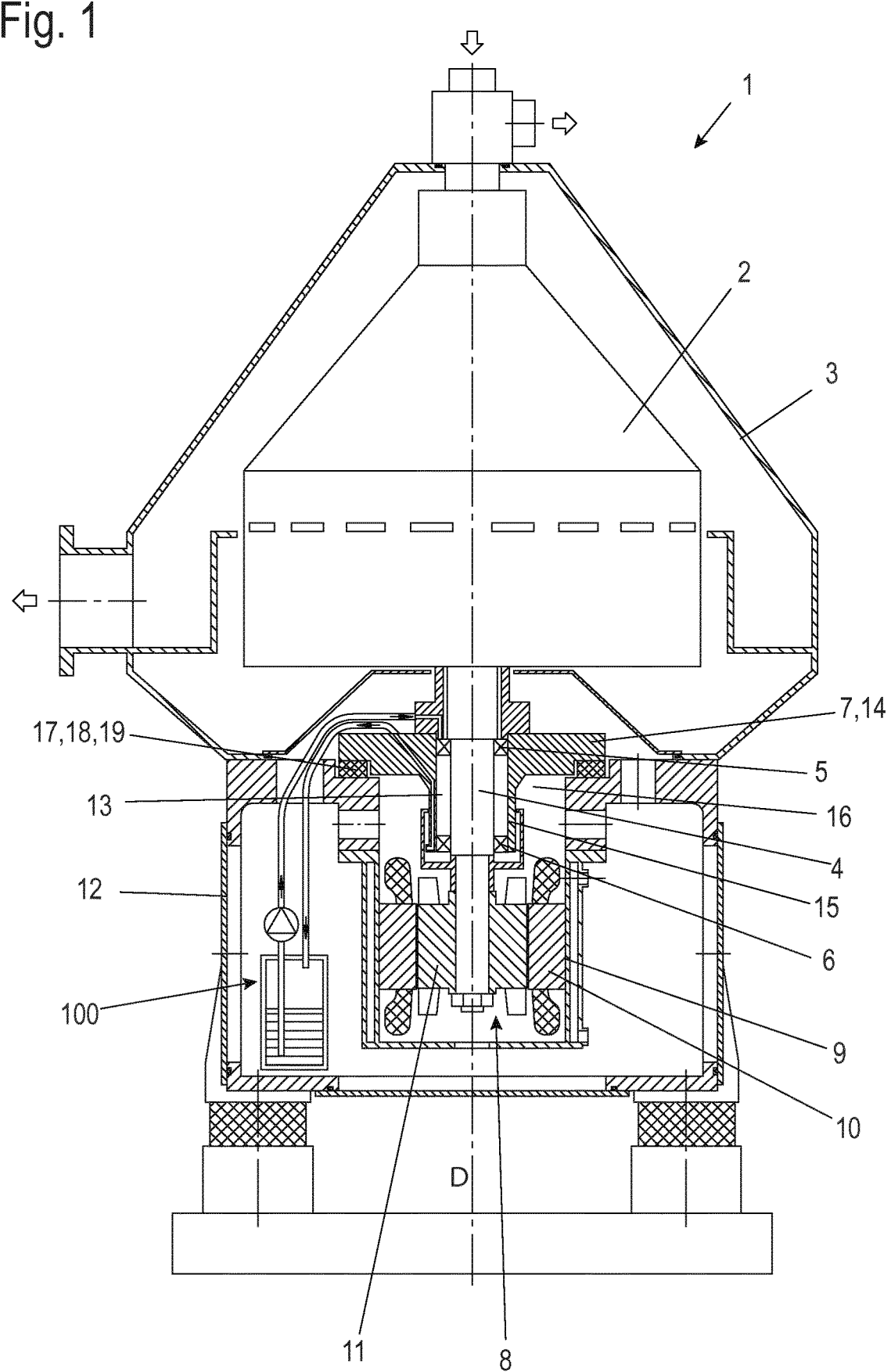

| | | | |
|---|---|---|---|
| 4,852,693 A | | 8/1989 | Nakajima et al. |
| 5,318,151 A | | 6/1994 | Hood et al. |
| 10,105,717 B2 | | 10/2018 | Mackel et al. |
| 2015/0051059 A1 | * | 2/2015 | Mackel .................. B04B 15/02 494/37 |

FOREIGN PATENT DOCUMENTS

| | | | | |
|---|---|---|---|---|
| CN | 207761817 U | * | 8/2018 | |
| DE | 69404581 T2 | | 12/1997 | |
| DE | 102013100180 A1 | | 9/2013 | |
| JP | S6198925 A | | 5/1986 | |
| JP | S6198925 U | * | 6/1986 | |

OTHER PUBLICATIONS

Search Report created on Dec. 6, 2018 in related/corresponding DE Application No. 10 2018 108 471.4.
Written Opinion mailed on Jul. 4, 2019 in related/corresponding International Application No. PCT/EP2019/058533.

* cited by examiner

METHOD BY WHICH A LUBRICANT FLOW RATE AT A CENTRIFUGE IS MONITORED

BACKGROUND AND SUMMARY OF THE INVENTION

Exemplary embodiments of the present invention relate to a method by which a lubricant flow rate at a centrifuge is monitored.

Centrifuges have a drive device with a motor in order to rotate at least one drum using this motor. This motor is generally an electric motor or—more rarely—a fluidically operated motor. The motor rotates directly or via interconnected further elements such as a transmission and/or a belt on a drive spindle, which is mounted using one or multiple bearings in a housing and/or frame. The drive spindle is in turn coupled in a rotationally-fixed manner to the drum of the centrifuge.

If a direct drive is implemented, the drive torque of the electric motor is introduced directly and sometimes even without a clutch into the drive spindle of the centrifuge. The rotor shaft of the electric motor can then even be led out of the electric motor and can even be connected in a rotationally-fixed manner as a drive spindle to the drum of the centrifuge.

The drive spindle of the centrifuge is rotatably mounted in a bearing arrangement, which has one or multiple bearings. The bearing arrangement is supplied with lubricant continuously by a lubricant supply in a continuous lubricant flow in many designs, wherein the lubricant supply can be designed according to the principle of a circulating lubrication. The lubricant circulation is generated by one or more pumps. The term "lubricant" is to be understood broadly and comprises free-flowing lubricants of greatly varying types, in particular lubricant oils.

Exemplary embodiments of the invention are thus usable at least in all of the above-described variants of centrifuges.

For frictionless operation of the centrifuge, a reliable supply of the bearing arrangement with lubricant is to be ensured. It is thus desirable with respect to the highest possible availability of the centrifuge if the lubricant flow is continuously monitored and at least one measured value of an operating state is regularly compared to at least one limiting value, so that it is displayable and/or a warning can be output and/or an action can be started due to deviations from these limiting values.

It is therefore desirable to install sensors/measuring devices for direct or indirect flow rate measurement in the lubricant circuit within a centrifuge drive having lubricant circulating lubrication.

The use of inductive flowmeters appears less reasonable since the use of this measurement principle is unsuitable due to the electric properties of many lubricants. A mass flow meter is suitable with respect to the measurement principle, but the circulating lubricant quantity is frequently too small for a reasonable use of the often quite costly measuring devices.

An oscillating piston meter generates a low counter pressure. Since the measurement takes place on the lubricant return side of the bearing, this lubricant pressure is generally not available in typical centrifuge bearings. The lubricant pressure on the lubricant feed side of the bearing can be used and measured, however, a possible clog in the lubricant circuit cannot be recognized in this way.

For this reason, other methods have been developed to measure the lubricant flow rate reliably.

In one known method of such a measurement of the lubricant flow rate in the lubricant circuit, the flow rate is determined by means of the weight of the lubricant which flows over a rocker, wherein the location of the rocker is contactlessly detected and evaluated.

In another known method of such a measurement of the lubricant flow rate, the lubricant level in a buffer container in the lubricant return line is measured by means of an optical measurement (for example, light refraction or turbidity), wherein the buffer container is provided with a drain and thus runs empty if the lubricant flow rate is disturbed.

Proceeding from the prior art, exemplary embodiments of the invention are directed to an improved method, using which a lubricant flow rate at a centrifuge is monitored, in particular of a separator or decanter.

A method is provided, using which a lubricant flow rate at a centrifuge is monitored, in particular of a separator or decanter, which has a rotatable drum which is rotatable using a drive device, wherein the drive device has a motor, which directly or indirectly drives a drive spindle that is coupled in a rotationally-fixed manner to the drum, wherein the drive spindle is rotatably mounted in a bearing housing by at least one bearing arrangement having at least one bearing, and wherein the centrifuge has a device for lubricant supply, using which the bearing arrangement is supplied with lubricant, which has at least the following steps:
a. rotating the drive spindle using the drive device and simultaneously operating the lubricant supply to generate a lubricant flow rate through the bearing arrangement.
b. monitoring the lubricant flow rate through the bearing arrangement on the basis of at least one measurement of a temperature of the lubricant at at least one measurement point on or in the device for lubricant supply.

Simple and also inexpensive and nonetheless very reliable monitoring of the lubricant flow rate through the bearing arrangement is possible on the basis of this at least one temperature measurement and monitoring.

A measurement point is a point of the lubricant supply, in particular on or in a line, at which a temperature sensor is arranged, the signal of which is evaluated directly at the sensor or at another location by an evaluation unit. This evaluation unit can be, for example, a control computer of the centrifuge.

According to one preferred variant, the monitoring can comprise a comparison of the measured temperature or a variable dependent thereon to at least one predetermined condition and the triggering of an action in the event of a deviation from the condition. The action can comprise, for example, the output of a warning signal and/or an emergency mode or a shutdown of the centrifuge.

In one preferred embodiment variant of the invention, a temperature of the lubricant is measured in each case at a first measurement point and at a second measurement point in the device for lubricant supply and the temperature difference is calculated in each case from the two measured values and the calculated temperature difference is compared to a condition defined for it—in particular a limiting value. A simply designed and reliable method results therefrom for monitoring the lubricant flow rate through the bearing arrangement of the centrifuge drive, since variations of the ambient temperature or changes of the machine temperature (for example, due to a hot product to be processed) can be eliminated.

It is also advantageous if a time curve of the measured temperature of the lubricant is formed, so that a temperature increase or a temperature decrease per unit of time is ascertainable by ascertaining the first derivative function of the measured temperature curve over time. A further simply designed and thus advantageous method for monitoring the lubricant flow rate through the bearing arrangement of the centrifuge drive thus results.

It is also advantageous if the device for lubricant supply includes a centripetal pump, to which the lubricant return line is connected. In this case, the device for lubricant supply can advantageously and simply have a ring space in which the lubricant collects in depressurized form. The lubricant circulation can thus be implemented with low design expenditure, since the rotational movement of an oil reservoir provided in any case, which co-rotates on the drive spindle, is used for the pump functionality.

A lubricant supply is also conceivable in which a rotating clamshell conveys the lubricant from an idle reservoir through a hole in the spindle to the at least one bearing.

In a further preferred embodiment variant of the invention, the temperature of the lubricant is measured continuously or quasi-continuously at the at least one measurement point. An instantaneous temperature can thus be displayed and evaluated, so that the state of the lubricant circulation can also be concluded on the basis of temperature-time curves.

The sensor elements used as the temperature sensor can be based on different action principles. The temperature of the lubricant at the at least one measurement point can thus be measured in each case simply, inexpensively, and sufficiently accurately, for example, using one or multiple variable electrical resistances or using one or multiple thermocouples, which preferably use the Seebeck effect, or using one or more thermal sensors having quartz oscillator.

In a further preferred embodiment variant of the invention, the position of the first measurement point is at or in the lubricant feed line and the position of the second measurement point is at or in the lubricant return line. In another or optional embodiment variant of the invention, the position of the first measurement point is at or in the lubricant return line and the position of the second measurement point is in the lubricant reservoir. The position of the first measurement point can also be in the lubricant reservoir and the position of the second measurement point can be located on the machine frame, however. Variants of these combinations are also conceivable. The measurement points are thus advantageously at locations each having clearly pronounced and well measurable temperature level, so that inferences about the instantaneous state of the lubricant circulation can be derived with high reliability and thus advantageously from a measured temperature difference.

BRIEF DESCRIPTION OF THE DRAWING FIGURES

Figure 2:
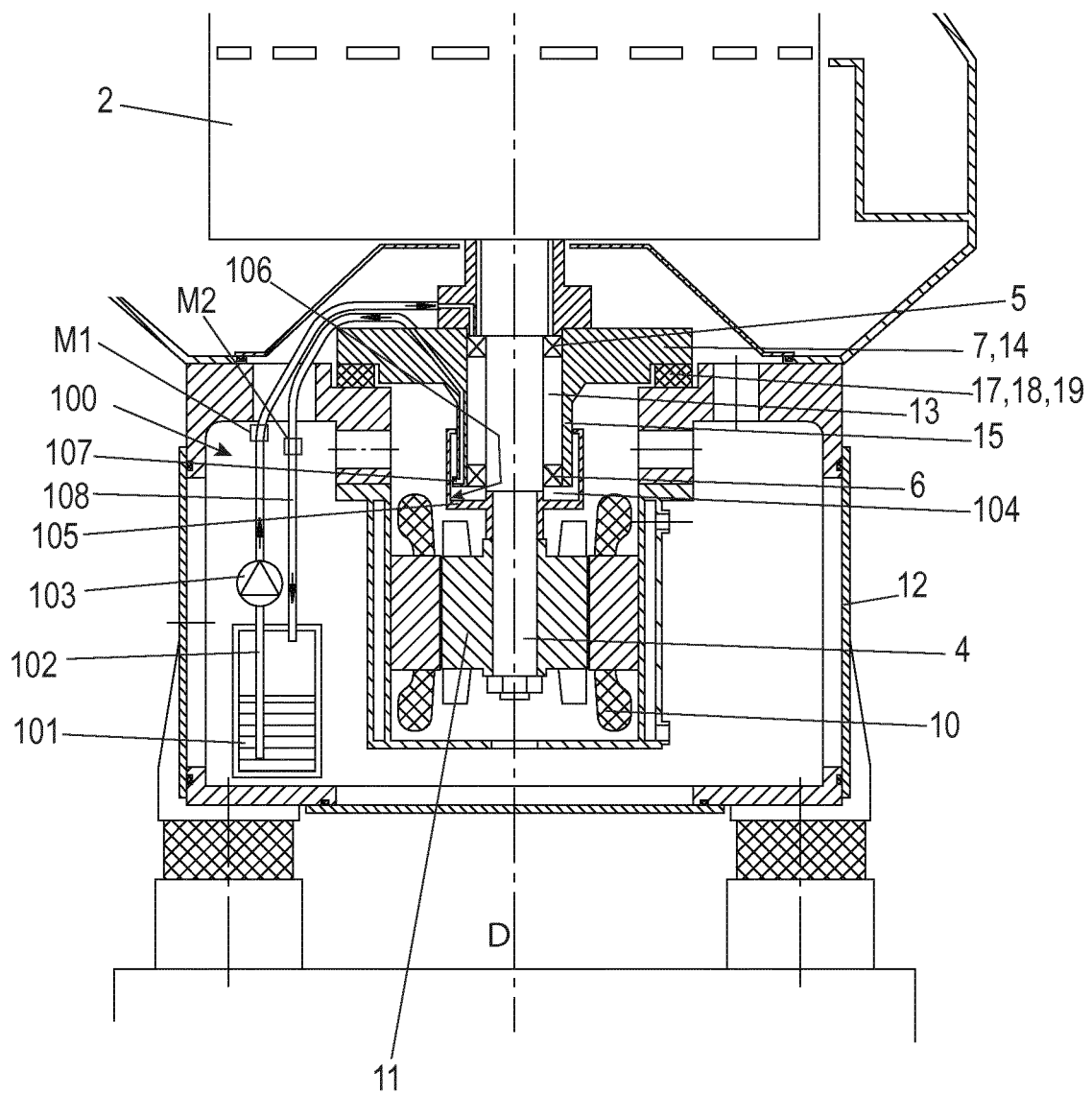

The invention is described in greater detail hereinafter on the basis of exemplary embodiments with reference to the figure. However, the invention is not restricted to these exemplary embodiments. In the figures:

FIG. 1: shows a front view of a separator in section; and
FIG. 2: shows a detail of the front view of the separator from FIG. 1 in section.

DETAILED DESCRIPTION

The invention is described hereinafter on the basis of a separator having vertical axis of rotation. This is a preferred but not required embodiment. The invention is also to be applied in centrifuges of other designs and also different alignment of the axis of rotation in space, thus in solid-wall scroll-type centrifuges or decanters.

FIG. 1 shows a separator 1 having a drum 2 having vertical axis of rotation D here, which is enclosed by a hood arrangement 3. Terms such as "top" and "bottom" refer hereinafter to the vertical arrangement of the drum 2. The drum 2 is placed on a drive spindle 4. This spindle is mounted rotatably in a bearing housing 7 using a bearing arrangement, which comprises a top bearing 5 and a bottom bearing 6 here. For example, this bearing arrangement has two roller bearings. Other designs are conceivable (not shown here).

A separator drive having an (electric) motor 8 as a drive device is used to drive the drum 2. This motor 8 has a motor housing 9 having a stator 10 or a stator winding and a rotor 11.

The motor 8 advantageously does not have a separate mounting here, which enables an inexpensive design. The bearing arrangement is arranged here between the motor 8 and the drum 2.

The drive spindle 4 is furthermore directly—i.e., preferably without interconnected elements, for example, a clutch—connected to the rotor 11 here by way of example. The motor housing 9 having the stator 10 is, in contrast, arranged rigidly and unsprung on the machine frame 12 of the separator 1 or supported thereon.

In this way, the drum 2 having the drive spindle 4, the rotor 11, and the bearing housing 7 form an oscillating unit, which is elastically supported on the machine frame 12, but with which the stator 10 is not associated, so that relative movements occur between the rotor 11 and the stator 10.

The drive spindle 4 is arranged by means of the bearing 5 and the bearing 6 in a hole-type opening 13 of the one-part or multipart bearing housing 7.

The bearing housing 7 has an upper flange 14 and a lower sleeve-like section 15, which extends through an opening 16 in the machine frame 12.

The upper flange 14 is supported via a circumferentially-distributed elastic damper elements 17 on the machine frame 12, which are distributed between the bottom side of the flange 14 and the top side of the machine frame 12, wherein the flange 14 and the machine frame 12 are provided with ring-like steps 18, 19 in the region of the damper elements 17.

The separator 1 furthermore has a device for lubricant supply 100, which supplies the bearing arrangement or the bearing 5 and the bearing 6 here with lubricant. The device for lubricant supply 100 operates here according to the principle of circulating lubrication.

The device for lubricant supply 100 is illustrated in FIG. 2. The device for lubricant supply 100 has a lubricant reservoir 101, in which a lubricant stock is stored. A lubricant feed line 102 plunges into the lubricant reservoir 101. A lubricant pump 103, which conveys the lubricant through the lubricant feed line 102 to the top bearing 5, is arranged in the lubricant feed line 102. The lubricant then flows through the bearing 5 and supplies the bearing 5 with lubricant at the same time. After the lubricant has left the bearing 5, it flows through the hole-type opening 13 of the bearing housing 7 to the bearing 6. The lubricant then flows through the bearing 6 and supplies the bearing 6 with lubricant at the same time.

The lubricant then exits from a bottom open end of the hole-type opening 13 on the lower sleeve-type section 15 of the bearing housing 7 and collects in unpressurized form in a housing-type ring space 104. The housing-type ring space 104 is formed by a housing 105 and the bearing housing 7, wherein the housing 105 encloses the bearing housing 7 on its lower sleeve-type section 15. Due to the rotation of the drive spindle 4, the lubricant collects in operation of the separator 1 on the outside 106 of the housing-type ring space 104.

A tubular attachment or projection 107 extending radially outward from the lower sleeve-type section 15 of the bearing housing 7 into the ring space 104 extends into this housing-type ring space 104 and merges like a non-corotating centripetal pump into a lubricant return line 108 for the lubricant, which firstly extends radially inward and then upward in the bearing housing 7 and exits therefrom on top and opens into the lubricant reservoir 101.

By means of this attachment 107 like a centripetal pump having the downstream lubricant return line 108, it is possible during rotations of the drum 2 and/or the ring space 104 to discharge the lubricant under pressure from the ring space 104 like a pump and conduct it back into the lubricant reservoir 101, without mist or sprays resulting. A centripetal pump is formed in this way, to which the lubricant return line 108 is connected.

Within the separator drive having such a device for lubricant supply 100, which operates according to the principle of the described lubricant circulation lubrication, a part of the resulting waste heat of the bearing arrangement, which arises due to bearing friction here in the top bearing 5 and the bottom bearing 6, is discharged to the lubricant.

This results in heating of the lubricant. This heating is measurable on or in the lubricant return line 108. If lubricant circulation no longer takes place (for example, because of a clog, a leak, or the failure of the lubricant pump 103) or if the lubricant circulation is reduced (partial clog), the value of the heating of the lubricant in the lubricant return line 108 changes.

In the event of a clog or interruption of the lubricant flow rate, the heating in the lubricant return line 108 is reduced starting from a previously reached operating temperature, since the power loss from the bearing can no longer be absorbed by the lubricant flow. In the event of a partial clog and a reduced volume flow in the lubricant return line 108 of the lubricant circuit, the lubricant temperature will increase, since the reduced oil quantity has to absorb the entire power loss from the bearing. The deviation of the lubricant temperature in the lubricant return line 108 from a defined normal state can thus be used to monitor the volume flow and therefore the lubricant flow rate.

It is now proposed that the lubricant temperature in the lubricant circuit be measured and the present state of the lubricant flow rate be concluded depending on the measured temperature.

The temperature can be measured at a single measurement point M1 in the lubricant circuit. The measurement can take place continually or quasi-continuously at short intervals.

By way of an evaluation of the results of such a continuous or quasi-continuous temperature measurement at this at least one measurement point M1, it is possible with the aid of a control unit and a suitable monitoring computer program to draw inferences about the state of the lubricant supply.

The temperature can thus be ascertained directly and can be used directly or indirectly as an indicator for the state of the lubricant supply.

Thus, for example, the temperature curve over time can also be ascertained and an item of status information about the trend of the temperature curve can be obtained from the first derivative of this function, which enables a prediction of the temperature development. At least one property of this derivative function (for example, slope) can also be compared to a defined limiting value to trigger an action in dependence thereon.

The temperature in the lubricant circuit can alternatively also be measured at multiple, in particular two different (each suitable) measurement points M1, M2 in the lubricant circuit and then, for example, the differential temperature $\Delta T$ between the temperatures respectively measured at the two measurement points M1, M2 can be used as a status criterion or monitoring criterion for a correct lubricant flow rate in the lubricant circuit. Using this method, variations of the ambient temperature or changes of the machine temperature (for example, due to a hot product to be processed) are eliminated, which results in significantly more stable operating behavior of the monitoring system.

A preferred suitable position for the first measurement point M1 is, for example, on or in the lubricant feed line 102. A preferred suitable position for the second measurement point M2 is on or in the lubricant return line 108 (see FIG. 2). Further suitable positions of the measurement points M1, M2 are the lubricant return line 108 (M1) and the lubricant reservoir 101 (M2) or the lubricant reservoir 101 (M1) and the machine frame 12 (M2).

The following example explains these relationships in greater detail:

With a volume flow or a lubricant circulation quantity (having an oil as a lubricant) of 1 L/minute and a thermal power emitted due to friction of the bearing arrangement of the drive spindle 4 of 400 W, a heating $\Delta T$ of 15° C. thus results between the measurement point M1 on or in the lubricant feed line 102 and the measurement point M2 on or in the lubricant return line 108. This heating is thus stored as the "normal value" in the controller of the centrifuge.

A defined deviation from this normal value to be reliably monitored could thus be $T_{Deviation} >= 5°$ C. This means that with a deviation of greater than 5° C. from a temperature differential previously ascertained as the normal value between the measurement points M1 and M2, a malfunction in the lubricant circuit has to be concluded and therefore a warning message or an action is triggered.

The temperature measurement is advantageously carried out in a continuous or quasi-continuous manner by commercially available temperature sensors or measurement principles.

With respect to the preferred measurement principles, for example, variable electrical resistors (for example, platinum measuring resistors such as Pt100 or silicon measuring resistors) can be used. The use of thermocouples, which utilize the Seebeck effect, is also conceivable. The use of a thermal sensor having quartz oscillator is also conceivable.

The signal of these temperature sensors is detected and evaluated, for example, by an electrical controller (not shown here) and can be continuously displayed.

As described, the time curve of the temperature of the lubricant in the lubricant circuit at a measurement point M1 or the temperature differential $\Delta T$ of the lubricant flowing to the bearing arrangement and the lubricant flowing back from the bearing arrangement can be calculated from the respective measured values which are ascertained at the measurement point M1 or M2, respectively, to then compare the result to a defined threshold value or limiting value.

In addition, the controller can be used during the startup of the centrifuge or the separator 1, thus when a temperature time curve which can be evaluated is not yet present or stable temperature differential $\Delta T$ has not yet resulted between lubricant flowing in and flowing back, to suppress a comparison to the defined limiting value.

This suppression can take into consideration both the startup time of the centrifuge or the separator 1 and also the run-down time. In addition, such a controller can adapt the defined limiting value to be monitored to the present operating conditions of the centrifuge. For example, if the speed of the centrifuge or the separator 1 is lowered due to method requirements, the power loss of the bearings 5, 6 also changes, which in turn requires a different defined limiting value which has to be monitored.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS

1 separator
2 drum
3 hood arrangement
4 drive spindle
5 top bearing
6 bottom bearing
7 bearing housing
8 motor
9 motor housing
10 stator
11 rotor
12 machine frame
13 opening
14 flange
15 section
16 opening
17 damper element
18 step
19 step
100 device for lubricant supply
101 lubricant reservoir
102 lubricant feed line
103 lubricant pump
104 ring space
105 housing
106 outside
107 projection
108 lubricant return line
M1 measurement point
M2 measurement point
D axis of rotation

The invention claimed is:

1. A method for monitoring a lubricant flow rate of a centrifuge, the method comprising:
rotating a rotatable drum of the centrifuge via a motor, which directly or indirectly drives a drive spindle, wherein the motor is coupled in a rotationally-fixed manner to the rotatable drum, wherein the drive spindle is rotatably mounted in a bearing housing by at least one bearing arrangement having at least one bearing;
simultaneously operating, while rotating the rotatable drum, a lubricant supply device to generate a lubricant flow rate through the bearing arrangement; and
determining the lubricant flow rate through the bearing arrangement based on at least one temperature measurement of the lubricant at at least one measurement point on or in the lubricant supply device,
wherein a temperature sensor is arranged at the at least one measurement point, and the output signal of the temperature sensor is evaluated by an evaluation unit,
wherein the determination of the lubricant flow rate comprises comparing the at least one temperature measurement or a variable dependent on the at least one temperature measurement to at least one predetermined condition, wherein an action is triggered when it is determined that there is a deviation from the at least one predetermined condition, and
wherein the at least one measurement point comprises a first measurement point and a second measurement point, wherein a temperature of the lubricant is measured at each of the first and second measurement points and a temperature differential is calculated using the temperature measured at each of the first and second measurement points, and wherein the calculated temperature differential is compared to a temperature differential condition, which is the at least one predetermined condition.

2. The method of claim 1, wherein the lubricant supply device circulates lubrication through the bearing arrangement.

3. The method of claim 2, wherein the lubricant supply device has a lubricant reservoir, a lubricant feed line, and a lubricant return line.

4. The method of claim 3, wherein the lubricant supply device has a lubricant pump, which is arranged on the lubricant feed line.

5. The method of claim 3, wherein the lubricant supply device has a ring space, in which the unpressurized lubricant collects.

6. The method of claim 3, wherein the lubricant supply device has a centripetal pump, which the lubricant return line adjoins.

7. The method of claim 3, wherein the first measurement point is on or in the lubricant feed line and the second measurement point is on or in the lubricant return line.

8. The method of claim 3, wherein the first measurement point is on or in the lubricant return line and the position of the second measurement point is in the lubricant reservoir.

9. The method of claim 3, wherein the first measurement point is in the lubricant reservoir and the second measurement point is on a machine frame supporting the centrifuge.

10. The method of claim 1, wherein the at least one temperature measurement of the lubricant is a continuous or quasi-continuous measurement at the at least one measurement point.

11. The method of claim 1, wherein the temperature sensor comprises one or multiple variable electrical resistors, one or multiple thermocouples, or one or multiple thermal sensors having quartz oscillator.

12. The method of claim 1, wherein the bearing arrangement has a top bearing and a bottom bearing.

13. A method for monitoring a lubricant flow rate of a centrifuge, the method comprising:

rotating a rotatable drum of the centrifuge via a motor, which directly or indirectly drives a drive spindle, wherein the motor is coupled in a rotationally-fixed manner to the rotatable drum, wherein the drive spindle is rotatably mounted in a bearing housing by at least one bearing arrangement having at least one bearing;

simultaneously operating, while rotating the rotatable drum, a lubricant supply device to generate a lubricant flow rate through the bearing arrangement; and determining the lubricant flow rate through the bearing arrangement based on at least one temperature measurement of the lubricant at at least one measurement point on or in the lubricant supply device, wherein a temperature sensor is arranged at the at least one measurement point, and the output signal of the temperature sensor is evaluated by an evaluation unit, wherein the determination of the lubricant flow rate comprises comparing the at least one temperature measurement or a variable dependent on the at least one temperature measurement to at least one predetermined condition, wherein an action is triggered when it is determined that there is a deviation from the at least one predetermined condition, and wherein the at least one measurement point comprises a first measurement point and a second measurement point, wherein a temperature of the lubricant is measured at each of the first and second measurement points and a temperature differential is calculated using the temperature measured at each of the first and second measurement points, and wherein the calculated temperature differential is compared to a temperature differential condition, which is the at least one predetermined condition, and wherein a time curve of the measured temperature of the lubricant is measured, and a first derivative function of the measured temperature curve over time is determined and compared to a predetermined condition in order to trigger an action in the event of a defined deviation from the predetermined condition.

14. The method of claim 13, wherein the lubricant supply device circulates lubrication through the bearing arrangement and wherein the lubricant supply device has a lubricant reservoir, a lubricant feed line, and a lubricant return line.

15. The method of claim 14, wherein the lubricant supply device has a lubricant pump, which is arranged on the lubricant feed line.

16. The method of claim 14, wherein the first measurement point is on or in the lubricant feed line and the second measurement point is on or in the lubricant return line.

17. The method of claim 14, wherein the first measurement point is on or in the lubricant return line and the position of the second measurement point is in the lubricant reservoir.

18. The method of claim 14, wherein the first measurement point is in the lubricant reservoir and the second measurement point is on a machine frame supporting the centrifuge.

19. The method of claim 13, wherein the bearing arrangement has a top bearing and a bottom bearing.

20. A method for monitoring a lubricant flow rate of a centrifuge, the method comprising:

rotating a rotatable drum of the centrifuge via a motor, which directly or indirectly drives a drive spindle, wherein the motor is coupled in a rotationally-fixed manner to the rotatable drum, wherein the drive spindle is rotatably mounted in a bearing housing by at least one bearing arrangement having at least one bearing;

simultaneously operating, while rotating the rotatable drum, a lubricant supply device to generate a lubricant flow rate through the bearing arrangement;

measuring a first temperature at a first measurement point on or in the lubricant supply device and measuring a second temperature at a second measurement point on or in the lubricant supply device, wherein the first and second measurement points are different measurement points;

calculating a temperature differential between the first temperature and the second temperature; and comparing the calculated temperature differential or a variable dependent on the calculated temperature differential with a temperature differential condition to determine the lubricant flow rate of the centrifuge.

* * * * *